United States Patent [19]
DeVault

[11] Patent Number: 5,555,738
[45] Date of Patent: Sep. 17, 1996

[54] AMMONIA ABSORPTION REFRIGERATION CYCLE FOR COMBINED CYCLE POWER PLANT

[75] Inventor: Douglas J. DeVault, Rootstown, Ohio

[73] Assignee: The Babcock & Wilcox Company, New Orleans, La.

[21] Appl. No.: 313,699

[22] Filed: Sep. 27, 1994

[51] Int. Cl.$^6$ .............................. F25B 27/00; F02C 1/00; F02G 3/00
[52] U.S. Cl. .............................. 62/238.3; 60/728
[58] Field of Search .................. 62/238.3, 476; 60/39.182, 728

[56] References Cited

U.S. PATENT DOCUMENTS

| | | | |
|---|---|---|---|
| 2,239,886 | 4/1941 | Feldbush et al. | 62/238.3 X |
| 2,362,714 | 11/1944 | Nettel | 60/728 X |
| 2,548,508 | 4/1951 | Wolfner | 60/728 X |
| 2,663,145 | 12/1953 | Waeselynck | 60/39.182 |
| 2,717,491 | 9/1955 | Barr | 60/39.182 X |
| 2,982,864 | 5/1961 | Furreboe | 60/39.182 X |
| 4,942,734 | 7/1990 | Markbreiter et al. | 60/39.02 |

Primary Examiner—William Doerrler
Attorney, Agent, or Firm—Daniel S. Kalka; Robert J. Edwards

[57] ABSTRACT

A power plant utilizing combined mode steam and gas turbines runs a refrigeration cycle powered by the energy in the rejected heat from the steam turbines and/or other waste heat source to cool the ambient inlet air to the gas turbines to have them operate more efficiently.

8 Claims, 1 Drawing Sheet

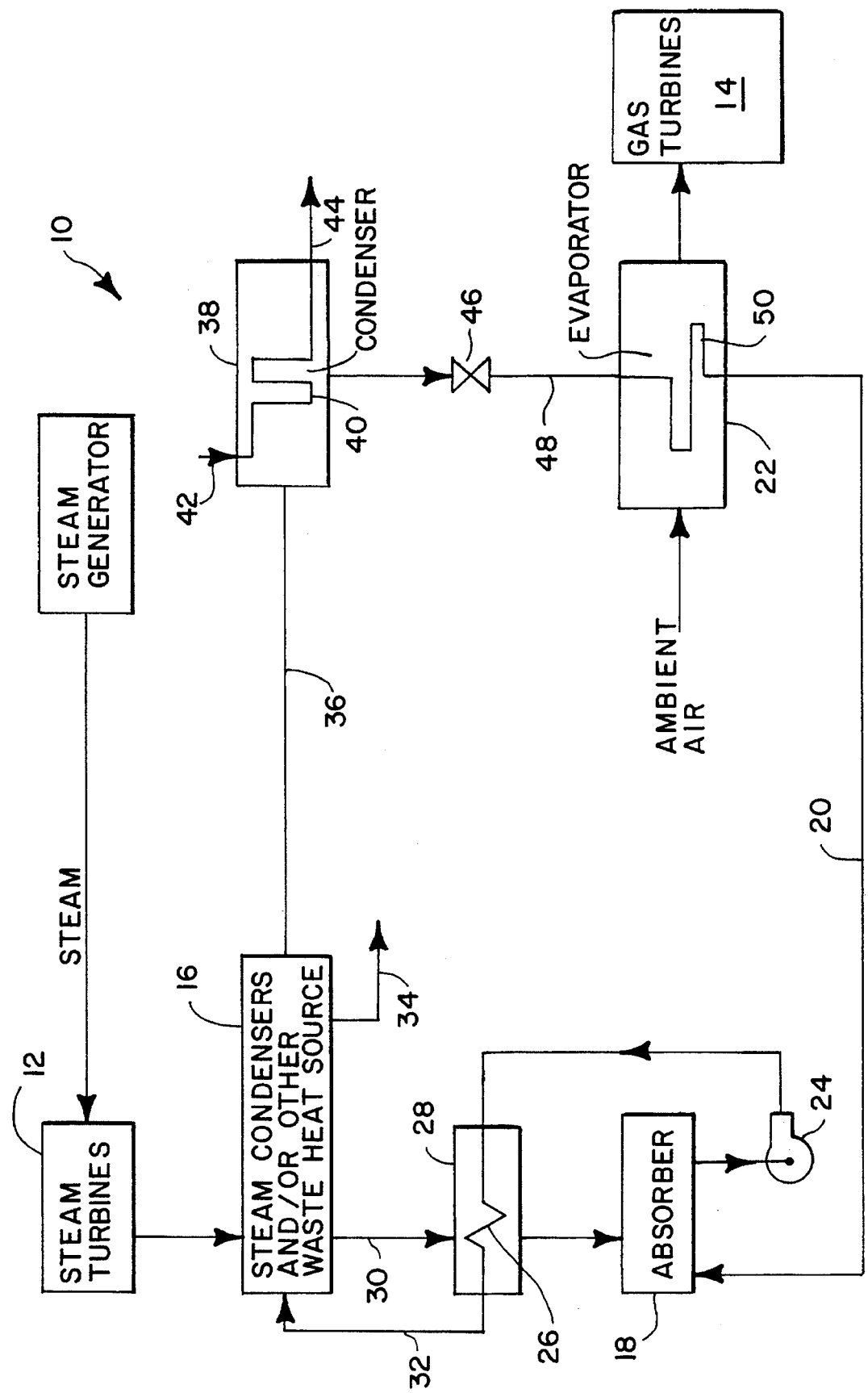

AMMONIA ABSORPTION REFRIGERATION CYCLE FOR COMBINED CYCLE POWER PLANT

BACKGROUND OF THE INVENTION

1. Field of the Invention

The present invention relates to steam power plants for generating electricity in general and more particularly to such plants utilizing combined cycle steam and gas turbines to provide more efficient and increased capacity power generation.

2. Description of the Related Art

Conventional power plants generate steam to drive steam turbines which generate electricity. The condenser of these steam turbines produces a significant amount of waste heat which is rejected. This heat rejection greatly reduces the cycle efficiency of the steam cycle.

Many power plants are adding gas turbines operating in a combined cycle with the steam turbines to boost plant cycle efficiency and to increase the power capacity of the power generating plant. These turbines can also generate waste heat from such devices as a compressor intercooler.

Problems surface with the use of the gas turbines in the combined cycle mode. When outside ambient temperatures are high, these ambient temperatures affect the capacity of the gas turbine whose output is inversely proportional to the ambient air intake temperature.

Thus the prior art needed a power plant where gas turbines running in a combined mode with steam turbines could operate at a decreased inlet air temperature.

SUMMARY OF THE INVENTION

The present invention solves the problem associated with prior art power plants utilizing combined steam and gas turbines as well as others by providing a power plant where the gas turbines operate at a decreased inlet air temperature cooled by the energy in the rejected heat from the condenser of the steam turbine and/or other waste heat sources.

To accomplish this the energy from the steam turbine condenser and/or other waste heat sources along with the favorable thermodynamic properties of ammonia are utilized to operate a refrigeration cycle cooling the ambient air entering the gas turbine compressor in a combined cycle power plant.

In view of the foregoing it will be seen that one aspect of the present invention is to provide a more efficient combined cycle power plant utilizing steam and gas turbines.

Another aspect of the present invention is to provide cooled gas turbine inlet air for a combined cycle power plant. Yet another aspect of the present invention is to utilize the rejected heat energy from the condenser of the steam turbine and/or other waste heat sources to operate a refrigeration cycle for cooling the gas turbine compressor inlet air of a combined cycle power plant.

These and other aspects of the present invention will be more fully understood upon a consideration of the following description of the preferred embodiment when considered in conjunction with the drawing.

BRIEF DESCRIPTION OF THE DRAWINGS

The drawing depicts a schematic of the present invention utilizing the heat from a steam turbine condenser to run a refrigeration cycle cooling the gas turbine inlet air of a combined mode power plant.

DESCRIPTION OF THE PREFERRED EMBODIMENTS

With reference to the drawing, it will be understood that the depiction is of a preferred embodiment of the present invention but that the invention is not limited thereto but includes all equivalents covered by the claims. In particular the drawing illustrates the use of a steam turbine condenser but other waste heat sources may be used in addition to or instead of.

An electric power generating plant 10 is operated in a combined cycle mode utilizing steam turbines combined with gas turbines 14 to generate electricity therefrom in a more efficient manner to produce increased plant 10 capacity. This is accomplished by utilizing rejected waste heat energy, such as from the steam turbines 12 captured in the steam turbine condensers 16, to power an ammonia absorption refrigeration cycle to cool the ambient air used by the gas turbine 14.

As is well known, high ambient air temperatures decrease the capacity of the gas turbine air compressor and thus reduce the output of the gas turbine 14. The present invention thus cools the ambient air by utilizing waste heat energy to increase the amount of net generated power.

The ammonia absorption refrigeration cycle begins with an absorber 18 containing a weak ammonia-water solution. Ammonia vapor is inputted to the absorber 18 along low pressure line 20 from an evaporator 22. The ammonia vapor is absorbed into the weak ammonia-water solution in absorber 18 to produce a strong ammonia-water solution which is pumped by a pump 24 through a heat exchanger core 26 to the waste heat source 16.

The heat exchanger core 26 is encased in a housing 28 supplied along line 30 by a weak solution of water/ammonia remaining from cooling the rejected steam from steam turbine 12. Stream 36 is the ammonia vapor created from the heat rejection in condenser 16. The heated solution in housing 28 causes the strong ammonia-water solution in the core 26 to be heated prior to entering the condensers 16 along line 32. The heated strong ammonia-water solution recovers heat from the condensing steam in the condensers 16 to vaporize most of the ammonia out of the solution to again form a weak ammonia-water solution which is passed to the housing 28 along line 30. Condensate is drained from the condensers 16 along line 34 to be returned to the steam cycle.

The vaporized ammonia in condensers 16 is outputted along line 36 as a high pressure ammonia vapor to a condenser 38 where it is condensed to liquid ammonia by a heat exchanger coil 40 located therein which is supplied with cooling water flowing through the coil 40 from inlet 42 to outlet 44.

The liquid ammonia from the condenser 38 is then passed through an expansion valve 46 which lowers the pressure of the ammonia while also lowering the temperature thereof. Some of the ammonia will flash to vapor during this pressure reduction but most will remain as depressurized liquid ammonia.

This liquid-vapor ammonia is then supplied along line 48 to an evaporation coil 50 in evaporator 22 over which coil ambient air is passed on its way to the gas turbine 14 compressor. The heat drawn from evaporating the liquid ammonia to vapor will cool the air below the outside ambient temperature and the low pressure vapor from coils 50 which is supplied along line 20 will return to the absorber 18 to start the cycle over again.

The described invention will thus improve the efficiency of the Rankine and Brayton cycles in a combined cycle Power Plant. The net result will be the ability to have the plant generate more power using less fuel. Not only will fuel savings be realized, but also a reduction in emitted pollutants from the burning of fossil fuel. The gas turbine will be able to maintain a consistent power output even when ambient temperatures are elevated.

As an example of the Ammonia Absorption Refrigeration Cycle (AARC), the following illustrates one application. This example is based on a heat balance of a 346 MW net, Pressurized Fluidized Bed Combustion (PFBC) power plant. This type of plant uses a steam turbine and a gas turbine operating in a combined cycle mode.

A strong solution of ammonia-water at an ammonia concentration of 25% on a weight percent basis is pumped from the absorber (18) to the heat exchanger core (26) at a pressure of 180 PSIA. The strong solution is heated from 60° F. to 70° F. by the returning weak solution along line 30. The strong solution then flows to the steam turbine condenser along path 32. The solution is heated in steam condenser 16 to approximately 90° F. at which point about 90% of the ammonia is vaporized out of the solution. Only about 2% of the rejected waste heat is used from the steam condenser in this case. The remaining weak ammonia-water solution then returns to heat exchanger shell 28 along path 30 to transfer heat to the strong solution in heat exchanger core 26. The high pressure ammonia vapor is then sent along path 36 to a vapor condenser 38 where the vapor is recondensed to liquid ammonia by cooling water. The ammonia liquid is then throttled to 73 PSIA across throttling valve 46. The ammonia contains about 10% vapor quality after throttling. The ammonia continues along path 48 to an evaporator core 50, where the liquid ammonia is vaporized from the heat given up by the ambient air in evaporator casing 22. This heat exchange cools the air entering the gas turbine compressor 14 from 90° F. to 60° F. thus increasing the amount of air used for the combustion of fuel which in turn increases the amount of fuel to be burned. The vaporized ammonia then returns along path 20 to the absorber where it goes back into solution to start the cycle again. The net power ouput from the power plant is over 2% greater from the use of this cycle.

Certain modifications and additions will occur to those skilled in the art upon reading this description of the preferred embodiment. It will be understood that this type of material has been deleted herein for the sake of conciseness and readability but is fully intended to be within the scope of the following claims.

What is claimed is:

1. A system for utilizing the rejected heat from a waste heat source to operate a refrigeration cycle for cooling ambient air for a gas turbine comprising:

a heat exchanger containing a strong solution of ammonia and water connected to said waste heat source to exhaust the rejected heat therein to vaporize the ammonia from the solution to form a high pressure ammonia vapor;

means for converting the vaporized ammonia from said heat exchanger to liquid ammonia;

means for throttling the liquid ammonia from said converting means to lower a pressure and temperature thereof;

evaporator means for cooling ambient air below an outside ambient air temperature by converting the liquid ammonia from said evaporator cooling means into a low pressure ammonia vapor and passing the cooled ambient air to a gas turbine compressor; and means for supplying the low pressure ammonia vapor to an absorber for producing the strong solution of ammonia and water for said heat exchanger.

2. A system as set forth in claim 1 wherein said converting means includes a water cooled condenser connected to said waste heat source.

3. A system as set forth in claim 2 wherein said throttling means includes an expansion valve connected between said water cooled condenser and said evaporator cooling means.

4. A system as set forth in claim 3 wherein said evaporator cooling means contains an evaporator coil therein for cooling ambient air prior to supplying same to the compressor of said gas turbine.

5. A combined cycle electric power generating plant having a steam generator, comprising:

a steam turbine driven by steam from a steam generator and providing rejected heat to a steam condenser;

a heat exchanger containing a strong solution of ammonia and water connected to said steam condenser to exhaust the rejected heat therein to vaporize the ammonia from the solution to form a high pressure ammonia vapor;

means for converting the vaporized ammonia from said heat exchanger to liquid ammonia;

means for throttling the liquid ammonia from said converting means to lower a pressure and temperature thereof;

evaporator means for cooling ambient air below an ambient temperature by converting the liquid ammonia from said evaporator cooling means into a low pressure ammonia vapor;

means for supplying the low pressure ammonia vapor to an absorber for producing the strong solution of ammonia and water for said heat exchanger; and a gas turbine having a compressor which receives and utilizes the cooled ambient air to increase an amount of net generated power in the combined cycle electric power generating plant.

6. A combined cycle electric power generating plant as set forth in claim 5, wherein said converting means includes a water cooled condenser connected to said steam turbine condenser.

7. A combined cycle electric power generating plant as set forth in claim 6, wherein said throttling means includes an expansion valve connected between said water cooled condenser and said evaporator cooling means.

8. A combined cycle electric power generating plant as set forth in claim 6, wherein said evaporator cooling means contains an evaporator coil therein for cooling ambient air prior to supplying same to the compressor of said gas turbine.

* * * * *